March 8, 1932. E. L. HILDEBRAND 1,848,528
LOCK FOR AUTOMOBILE AND OTHER DOORS
Filed Dec. 17, 1929 2 Sheets-Sheet 1
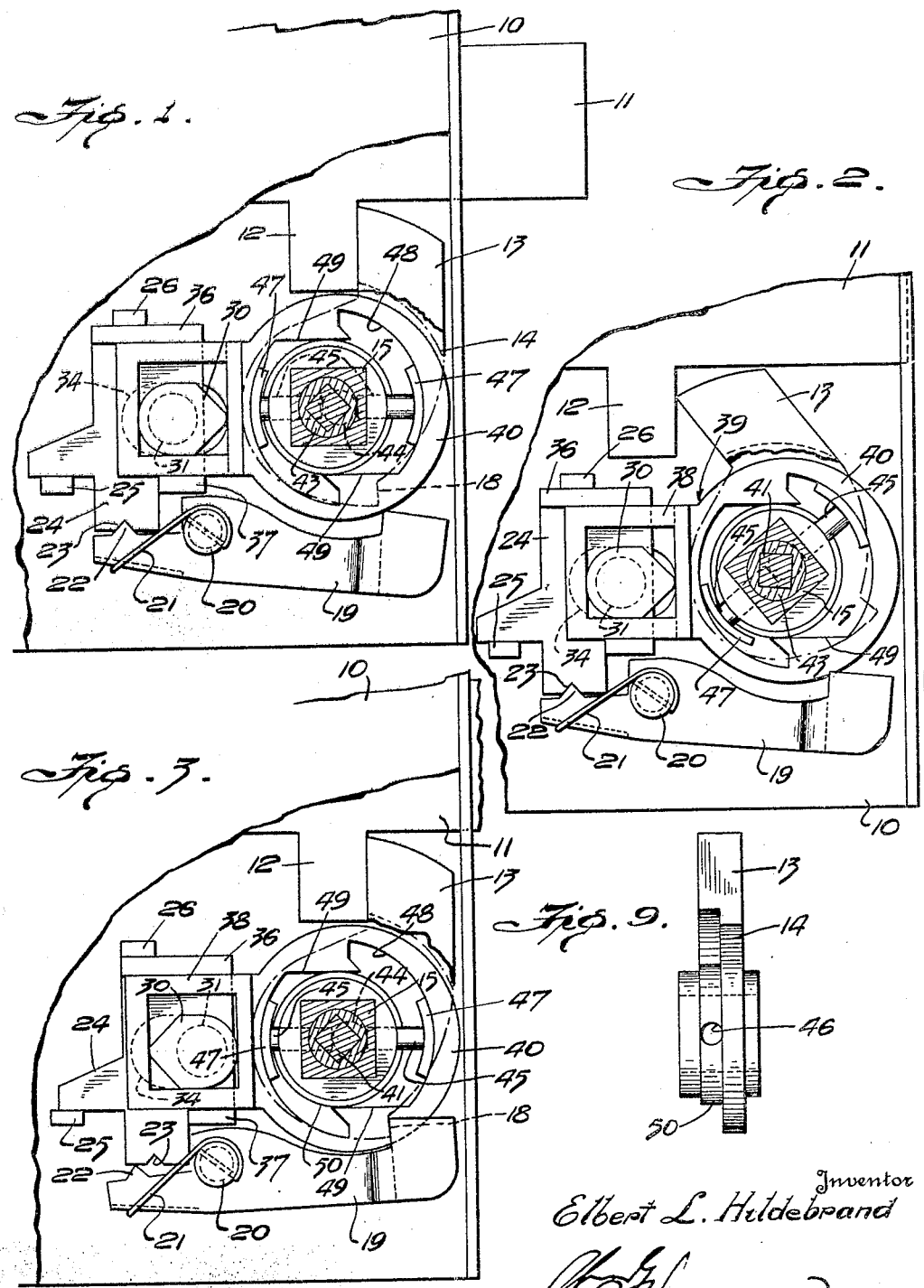
Inventor
Elbert L. Hildebrand
By
Attorney

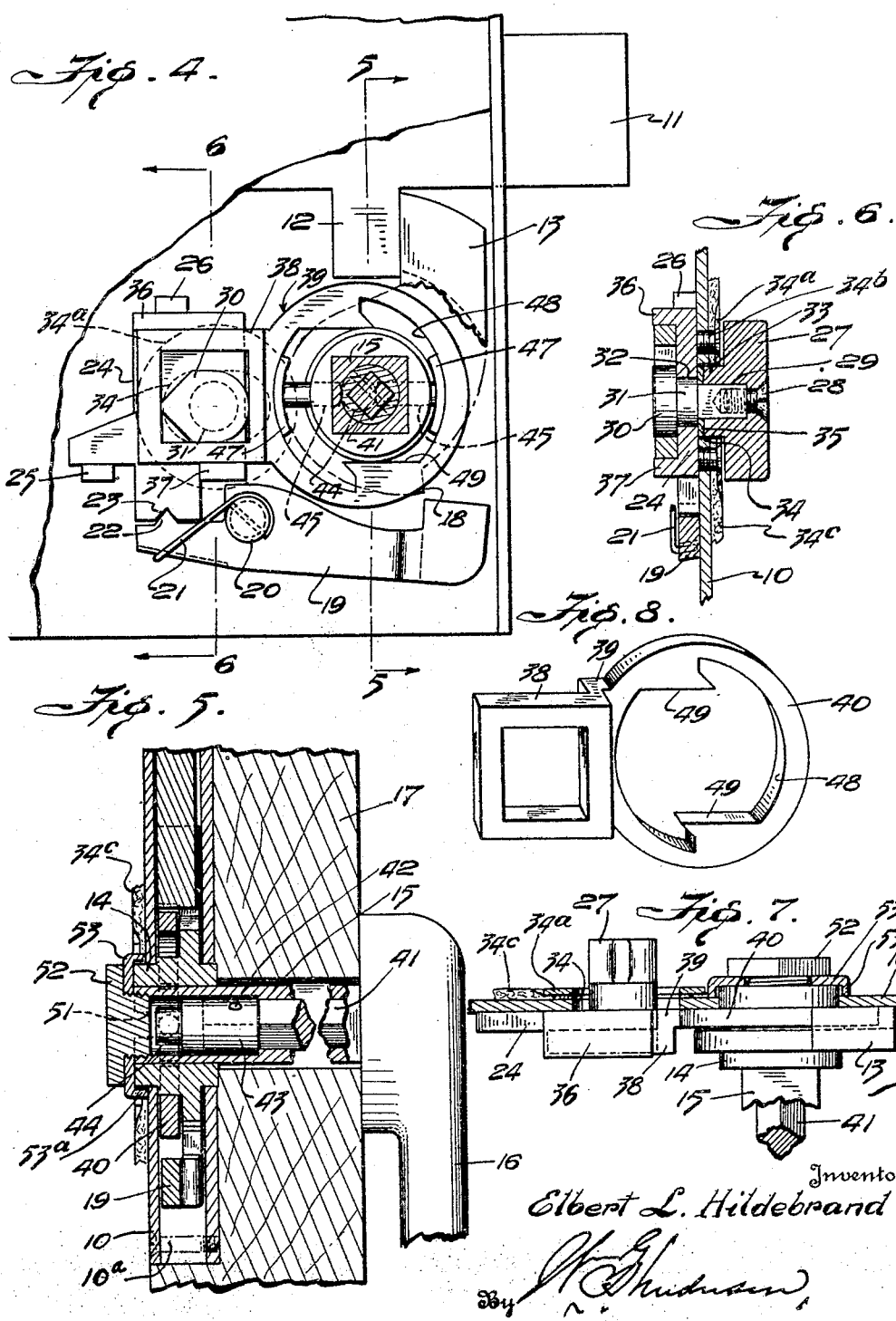

Patented Mar. 8, 1932

1,848,528

UNITED STATES PATENT OFFICE

ELBERT L. HILDEBRAND, OF CHARLES CITY, IOWA, ASSIGNOR OF ONE-FOURTH TO EDWARD KAMMEYER AND ONE-FOURTH TO WALTER J. HILDEBRAND, OF GREENE, IOWA

LOCK FOR AUTOMOBILE AND OTHER DOORS

Application filed December 17, 1929. Serial No. 414,778.

This invention relates to improvements in locks, and more particularly to an improved lock of the type used for the doors of sedans, limousines or other closed bodies of automobiles.

The primary object of the invention is to provide a lock of this character, which may be placed in locked position by manipulating a button or the like arranged within the car, and which may be unlocked from the exterior of the body by means of a key. This invention will enable an automobile operator to lock all of the doors of the automobile from the inside of the car before leaving the latter, and permit the operator to unlock any one of the doors at either side of the car from the exterior, by means of a suitable key.

A further object of the invention is to provide a structure of this character, of simple, inexpensive and practical construction, and one which will not be liable to get out of order.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is an elevation, partly in section, of an automobile door lock provided with my improvements, and showing the parts in unlocked position.

Fig. 2 is a similar view with the parts unlocked, but with the bolt retracted.

Fig. 3 is a like view with the parts in locked position.

Fig. 4 is a similar view but illustrating the manner in which the parts are put into unlocked position when the locking mechanism is unlocked by means of a key.

Fig. 5 is a vertical sectional view on the line 5—5 of Fig. 4.

Fig. 6 is a similar view on the line 6—6 of Fig. 4.

Fig. 7 is a sectional plan view of some of the parts, and showing how these parts embrace each other.

Fig. 8 is a perspective view of a movable plate forming part of the mechanism.

Fig. 9 is an elevation of the bolt retractor.

In the drawings, 10 designates a lock case in which is slidably mounted a conventional spring projected bolt 11, having a depending lug 12 which is actuated by a finger 13 of a special form of retractor 14. As best shown in Fig. 5, this retractor is mounted on, and turns with a hollow shaft 15, which is actuated by an external handle 16, carried by the door 17. Obviously, when the handle is turned in the proper direction, the shaft 15 will cause the retractor 14 to retract the bolt, as illustrated in Fig. 2.

To prevent the retractor from turning whenever desired, the retractor is provided with a shoulder 18 that is adapted to be engaged by a pawl or dog 19, which is pivotally mounted on a rivet or stud 20, secured to the lock case, and is normally held in disengaged position by a spring 21, which has one of its ends secured to the stud, and its opposite end engaging the under side of the tail of the dog.

Normally, this spring holds the dog in the position shown in Fig. 1, so that an angular nose 22 of the dog, extends into an angular recess 23 of a horizontally sliding plate 24. This plate is guided by means of horizontal ears or lugs 25 and 26, which are rigidly united with the lock casing, and may be struck from the latter if the casing is made of sheet metal.

This sliding plate 24 may be shifted forwardly and rearwardly by means of a button 27 (Figs. 6 and 7). To this end, the button is rigidly secured by means of a screw 28, to the squared end 29 of a cam 30, which has a cylindrical intermediate portion 31 that passes through a cylindrical hole 32 in the sliding plate 24. The button has an inwardly extending cylindrical boss 33 which extends into a horizontally elongated slot 34 in the lock casing, and impinges against a spring washer 35 that is arranged between the boss 33 and the sliding plate 24. From this it may be seen that when the button 27 is shifted back and forth, its boss 33 will slide in the slot 34, and the portion 31 of the cam member will cause the plate 24 to reciprocate.

A trimming plate 34a having an elongated slot therein to accommodate the shank 29, is secured to the lock casing by screws 34b and holds down the upholstery cloth 34c at the point where the button 27 is arranged.

The plate 24 is provided with upper and lower horizontal flanges 36 and 37 which guide the square portion 38 of another sliding plate 39 of the type shown in Fig. 8. It will be observed that this plate also includes a substantially circular portion 40 which is offset relatively to the square portion 38.

The cam 30 is adapted to turn 180 degrees within the squared portion 38, and when it is turned from the position shown in Fig. 1 to the position shown in Fig. 4, and the button 27 is pushed forwardly, the sliding plate 24 will be shifted forwardly as shown in Fig. 3, so that the nose 22 will be forced out of the cavity 23, and the forward end of the dog 19 will be caused to engage the shoulder 18 of the retractor 14 to prevent the latter from operating under the influence of the handle 16. In other words, this places the parts in the locked position shown in Fig. 3. Of course, the parts may be readily unlocked from the inside of the car by simply shifting the button 27 rearwardly, but in order to unlock the parts from the exterior of the car, it is necessary to use a key. For this purpose, any ordinary key operated cylinder lock may be employed to actuate a square spindle 41 which is rotatably mounted in the shaft 15, and is secured by a pin 42 to a cap 43 that has an inwardly extending cylindrical boss or cam 44, the axis of which is offset or eccentric to the axis of the shaft 15. This cam is employed to actuate sliding pins 45 which are slidably mounted in diametrically opposite apertures 46 of the retractor 14, and are provided with curved heads 47 which slidably engage curved cam surfaces 48, arranged within the circular portion 40 of the sliding plate 39.

At this point it will be noted that this circular portion has inwardly extending lugs provided with horizontal surfaces 49, which engage a cylindrical portion 50 of the retractor, and act to guide the sliding plate 39 as the latter moves back and forth.

To facilitate assemblage of the parts, the inner end of the hollow shaft 15 is provided with diametrically opposite notches or slots 51 (see Fig. 5), to receive the pins 45, and the inner end of the shaft is closed by a screw cap 52 which bears against a washer 53 that has a flanged edge 53a which engages the inner surface of the lock casing. This washer is necessary to permit enough threads in handle shaft 15.

It is believed that the operation of the device will be clear from the foregoing, but by way of repetition, it may be stated that when the parts are in the unlocked position shown in Fig. 1, any time the handle 16 is turned, the retractor 14 will move in a counter-clock-wise direction, and cause the finger 13 to push on the lug 12 and cause the retraction of the bolt 11, to allow the door to be opened. At such times, the eccentric cam 44 turns about the axis of the shaft 15, and consequently, it will cause one of the pins 45 to be projected, and the head of that pin to ride on one of the curved surfaces 48 of the plate 39, while the other pin 45 is being pushed toward the cam 44 by the other one of the curved surfaces 48.

When it is desired to lock the door, the button 27 is first given a half turn to move the cam 30 from the position shown in Figs. 1 and 2, into the position shown in Fig. 4, and then the button is moved forwardly along its guide slot to cause the sliding plate 24 to move the dog 19 from the position shown in Fig. 4, into the position shown in Fig. 3. Of course, at such time, the dog will prevent the retractor 14 from being actuated by the handle 16.

When the parts are to be unlocked, the proper key is inserted in the cylinder lock heretofore mentioned, and the key is used to turn the spindle 41, with the result that the cam 44 is actuated, and it causes the pin 45 which is nearest the cam 30, to shift the plate 39 toward the left, and as such plate is bearing upon the cam 30, the latter will also be shifted in the same direction, and its cylindrical portion 31 will move the sliding plate 24 toward the left, so as to bring the cavity 23 into register with the nose 22, so that the spring 21 can shift the dog 19 into the unlocked position.

The spring 21 not only functions to normally maintain the dog in retracted position, but it prevents a number of the parts from rattling.

While I have disclosed what I now believe to be a preferred embodiment of the invention in such manner that the construction, operation and advantages thereof may be clearly understood by those skilled in the art, I am aware that changes may be made in the details disclosed, without departing from the spirit of the invention, as expressed in the claims.

The front and rear plates of casing 10 will be connected together by a desired number of threaded bolts or screws 10a indicated by dotted lines in Fig. 5, or otherwise.

What I claim and desire to secure by Letters Patent is:

1. In a lock, a bolt, a retractor for the bolt, a dog member engageable with the retractor for locking the latter, a manually actuated member, one of said members having a cavity and the other having a nose projecting into said cavity when the dog is out of engagement with the retractor.

2. In a lock, a bolt, a bolt retractor, a member for locking the retractor against movement, means normally holding said member out of engagement with the retractor, a manually actuated member, and cooperating cam surfaces on said members to permit the manually actuated member to force the locking member into engagement with said retractor.

3. In a lock, a retractor locking pawl member, a movable plate member, cooperating cam surfaces on said members, a manually actuated cam element rotatably mounted on and extending through said plate member, a second plate arranged to be shifted by said cam element, and key actuated means for moving the second plate in one direction.

4. In a lock, a retractor locking member, a sliding plate member, cooperating cam surfaces on said members, a manually actuated cam member having a portion rotatably mounted in the sliding plate member, a shiftable member having an aperture, a portion of said cam element extending into said aperture, and key operated means for moving the shiftable member in one direction.

5. In a lock, a casing, a retractor locking member movably mounted in the casing, a sliding plate member, cooperating cam surfaces on said members, a manually actuated cam element having a portion rotatably mounted in said plate member, an elongated slot in the casing in which another portion of the cam member is slidable, a shiftable member engaging another portion of the cam element, and key actuated means for moving said shiftable member, cam element and sliding plate member.

6. In a lock, a casing, a retractor locking member movably mounted in the casing, a movable plate for actuating said locking member, a cam element having its intermediate portion rotatably mounted in said plate, the casing having a slot, another portion of the cam element extending through said slot from the interior to the exterior of the casing and provided at its outer end with a finger button, another member arranged to be shifted by said cam element, and key actuated means for moving the last mentioned member.

7. In a lock, a casing, a retractor locking member movably mounted in the casing, a rectilinearly slidable member in the casing, cooperating cam surfaces on said members, a cam element having its intermediate portion rotatably mounted in said plate member, the casing being provided with a slot, another portion of the cam element extending through said slot from the interior to the exterior of the casing and having a finger button on its outer end, said cam element having a cam portion at its inner end, a shiftable member having an aperture in which the cam portion operates, and key operated means for shifting the last mentioned member in one direction.

8. In a lock, a retractor locking member, a movable member for actuating the locking member, a manually operated cam element operatively engaging the second mentioned member for movement in unison therewith, a shiftable plate provided with a plurality of apertures, the cam element extending into one of said apertures for shifting said plate in one direction, and key actuated means extending into the other one of the apertures for shifting said plate in the opposite direction.

9. In a lock of the character described, a handle actuated hollow shaft, a bolt retractor mounted on and movable with said shaft, slidable pins extending through the wall of said shaft, a retractor locking mechanism operatively connected to said pins, and key actuated means for shifting said pins.

10. In a lock of the character described, a handle actuated hollow shaft, a bolt retractor mounted on and movable with said shaft, a retractor lock engageable with said retractor, means including a ring-like member for moving said locking member out of engagement with the retractor, axially movable pins engaging the ring-like member and projecting into said shaft, a cam in the shaft for shifting said pins, and key actuated means for moving said cam.

11. A door locking mechanism, comprising a slidable bolt, a plurality of plates slidable relatively to each other, one of the plates including a bolt retractor, a dog in one position serving to lock the retractor, a cam associated with one of the plates adapted to rotate and also to be shiftable laterally to move the plate to disengage the dog from the retractor, a cam associated with the plate which carries the retractor, and means for actuating said cam to operate the retractor to retract the slidable bolt.

12. A door locking mechanism comprising a slidable bolt, a plurality of plates slidable relatively to each other, one of the plates including a bolt retractor, a dog in one position serving to lock the retractor, a cam associated with the plate and operable to move the plate to disengage the dog from the retractor, a handle operable from the inside face of a door for causing the retractor to retract the slidable bolt, and key actuated mechanism operable from the outside face of the door and operatively connected with cam mechanism of the retractor member of one of the slidable plates for actuating the retractor to retract the slidable bolt.

In testimony whereof I affix my signature.

ELBERT L. HILDEBRAND.